United States Patent
Meisterling

[15] 3,669,334
[45] June 13, 1972

[54] METHOD AND APPARATUS FOR FEEDING DISCRETE PARTS TO A COLD HEADING MACHINE

[72] Inventor: John W. Meisterling, Rocky Hill, Conn.
[73] Assignee: Contacts, Incorporated, Wethersfield, Conn.
[22] Filed: June 30, 1970
[21] Appl. No.: 51,291

[52] U.S. Cl. ................................ 228/3, 10/156, 10/157, 228/49
[51] Int. Cl. ........................... B23k 21/00, B23p 3/02
[58] Field of Search ............... 29/470.1; 228/3, 4, 6, 47, 228/49; 10/156, 157

[56] References Cited

UNITED STATES PATENTS

| | | | |
|---|---|---|---|
| 1,812,743 | 6/1931 | Gagnon | 10/156 |
| 1,874,678 | 8/1932 | Williams | 10/157 |
| 3,026,603 | 3/1962 | Zysk et al. | 29/470.1 X |
| 3,247,533 | 4/1966 | Phipard, Jr. | 10/27 X |
| 3,359,580 | 12/1967 | Osman et al. | 10/15 X |
| 3,397,454 | 8/1968 | Gwyn, Jr. | 228/4 X |
| 3,547,334 | 12/1970 | Gwyn, Jr. | 29/470.1 X |

Primary Examiner—John F. Campbell
Assistant Examiner—Richard Bernard Lazarus
Attorney—Marn & Jangarathis

[57] ABSTRACT

The machine is described with reference to the production of cold bonded composite electrical contacts. A cold heading machine is altered to permit contact facing material to be fed into the coning punch assembly in discrete pieces such as balls, cylinders or the like. Ordinarily, pieces severed from a wire feed are delivered directly to the header die. In the present invention, the coning punch acts as a carrier of this material to the header die. The preferred apparatus is inherently self-timing, loading the contact facing material into the coning punch at its "rest" position. Optionally, individual body and facing components may be initially bonded as by brazing, and fed to the cold heading machine by the apparatus of the invention, eliminating wire feed and severing entirely. By virtue of the invention, facing and body components need not be of the same diameter, coning shapes are optimized, and a larger variety of heading diameters, facing thicknesses and heading ratios may be obtained. Stronger interfacial bonding is also achieved.

4 Claims, 3 Drawing Figures

PATENTED JUN 13 1972 3,669,334
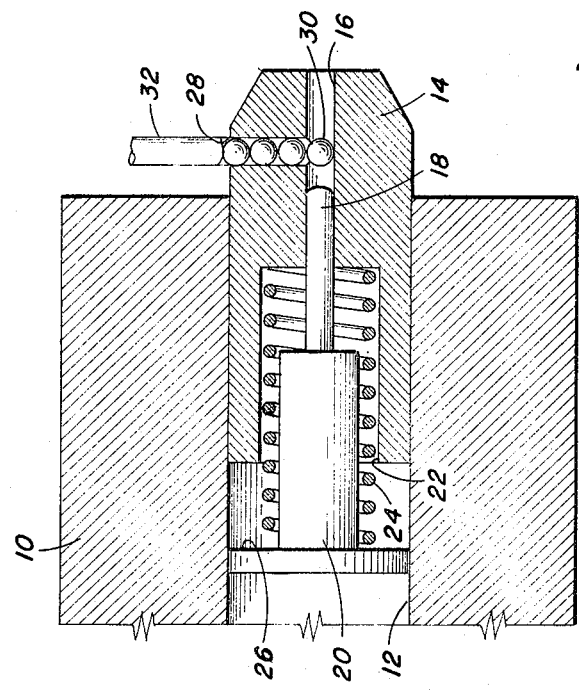
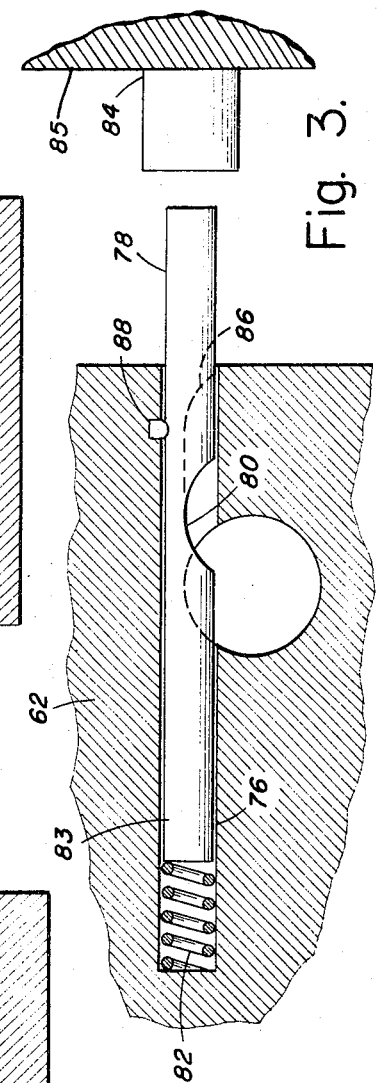
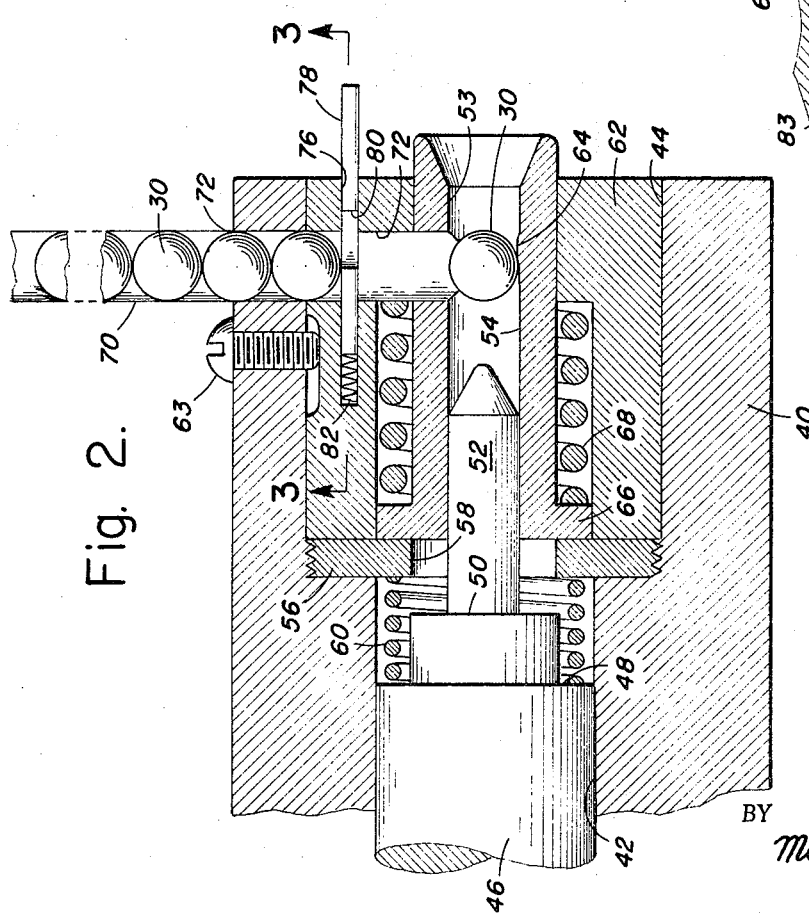
INVENTOR.
John W. Meisterling
BY
Marn & Jangarathis
ATTORNEYS

METHOD AND APPARATUS FOR FEEDING DISCRETE PARTS TO A COLD HEADING MACHINE

BACKGROUND OF THE INVENTION

Prior to the development of cold bonding techniques, composite electrical contacts, e.g. contacts with a facing material such as silver and a body of copper, were produced by complex procedures involving much handling. U.S. Pats. No. 2,049,771 and No. 2,199,241 are illustrative. Cold heading techniques are much preferable inasmuch as the entire operation is carried out automatically in a single machine operating at a relatively high speed. Broadly speaking, all cold heading techniques practiced heretofore involve feeding the two materials in wire form into the machine, cutting off the desired length of each material, transferring the severed wire lengths, in appropriate juxtaposition, into a die, delivering an initial coning blow to partially form the contact shape and partially bond the facing and body portions, delivering a finishing blow or blows to complete bonding and form the desired contact facing shape, and removing the finished contact from the machine.

Representative prior art patents in this area are as follows:

| Cooney    | 2,739,369 |
| Zysk et al. | 3,026,603 |
| Razmus    | 3,106,013 |
| Gwyn      | 3,191,276 |
| Gwyn      | 2,311,965 |
| Gwyn      | 3,371,414 |

In the latter patent, wire feed of the facing material enters a bore in a cutter bar at a first position and is sheared by movement thereof to a second position. Wire of the body material is fed into the bore at the second position and is sheared by movement of the cutter bar to a third position. The third position is opposite a die cavity, and at this position a hammer pin enters the bore from the opposite side, driving the assembled wire segments into the die cavity and delivering the first coning blow. Additional forming blows follow, and the finished contact is ejected with a knock-out pin. As noted in this patent, if the operation is carried out rapidly enough, the sheared surfaces are clean and a good bond results.

Problems associated with cold bonding operations generally involve the quality of the bond between the facing and body portions, and flow of the metal during the coning and finishing steps. A weak bond can result in early failure of the contact in service. Uneven flow of the facing and body portions often results in a weak bond, but can also affect contact resistance and other electrical properties.

An inherent limitation in the above-noted patents and in all known commercial cold heading machines is that the wire feedstocks of copper and silver (or whatever body and facing materials are employed) must be of the same diameter. While the facing thickness can be varied by controlling the length of silver wire relative to the length of copper wire sheared off, there are limits to this. Further, when starting with two cylindrical segments of the same diameter, there are limits on the diameter of the contact head which can be produced, and on the ratio between the diameter of the shank of the contact and the diameter of the head (referred to as the heading ratio). These limitations were accepted, heretofore, inasmuch as there was no known way of feeding components of different diameters into the die and retaining them therein during the initial coning blow.

The type and quality of the coning blow are largely determinative of the distribution of facing and body materials in the finished contact. With two cylindrical segments of equal diameter as starting materials, the varieties of coned shapes that can be produced are also necessarily limited.

OBJECTS OF THE INVENTION

A general object of the present invention is to provide an improved method and apparatus for cold bonding composite contacts which overcomes the foregoing limitations.

An additional object of the present invention is to provide an apparatus for feeding discrete pieces of material into the coning punch carrier of a cold heading machine, which peices are not limited as to size or shape.

Another object of the present invention is to provide an improved method of cold bonding composite contacts which is not limited to facing and body materials of the same diameter or shape.

Still another object of the invention is to provide apparatus for producing composite electrical contacts from raw materials of differing size and/or shape which is inherently self-timing.

Yet another object of the invention is to provide apparatus for feeding discrete, pre-assembled parts into a cold heading machine.

Various other objects and advantages of the invention will become clear from the following description of embodiments thereof, and the novel features will be particularly pointed out in connection with the appended claims.

THE DRAWINGS

In the accompanying drawings:

FIG. 1 is a cross-sectional elevation of a coning punch assembly in accordance with the present invention;

FIG. 2 is a cross-sectional elevation of a coning punch assembly in accordance with another embodiment of the invention; and FIG. 3 is a view taken along line 3—3 of FIG. 2.

DESCRIPTION OF EMBODIMENTS

Prior to describing the method and apparatus of the invention in detail, some attention should be directed to how the shape and size of the facing material component, and the configuration of the coning punch can be employed to affect the shape and configuration and cross-section of the finished composite contact. In each case, the body material is usually a length of severed copper wire. The facing material may be a cylinder of silver wire of the same diameter as the copper wire, i.e. typical of the prior art. However, cylinders of progressively greater diameter could advantageously be employed. Similarly, spheres of the same and larger diameter, could be used, as could a rivet shaped facing material. By varying the proportions of the head and shank portions, various configurations of coned shapes can be obtained. Other shapes, for example, a double-shanked rivet, pyramidal, or the frustrum of a cone, could also be used. The significant feature is that, if the shape and size of the contact facing slug can be varied within broad limits, the shape, size and cross section of the completed composite contact can be similarly varied.

To properly understand the method and apparatus of the present invention, it is necessary to have some familiarity with cold heading machines. A solid die, double stroke header will be described. The die block is stationary, contains the die and, generally, the bores for feeding the wire or wires and associated apparatus for shearing the wires and transporting them into axial alignment with the die. The punch holder contains both the coning punch and the finishing punch, and one and then the other are moved into the die to form the contact. A knock-out pin, which forms the bottom of the shank portion of the die cavity, pushes the completed contact out of the die.

In operation, a standard roll feed mechanism advances the copper wire through the quill and up against the wire stop. A cutter knife shears the desired length of wire (as determined by the position of the wire stop) and moves it into axial alignment with the die cavity. At the same time, the punch holder is moved by a standard gate movement until the coning punch is also in axial alignment with the die cavity, with the wire segment (or segments) therebetween. The coning punch is then actuated by a ram, pushing the segment into the die and delivering the coning blow. As the coning punch advances, the cutter bar returns to its starting position. The coning punch may be a single punch, or may have a central punch and an annular sleeve, both of which advance partially into the header die, as described more fully below. The coning punch is withdrawn by the standard gate action of the header, leaving the coned (partially shaped) contact in the die. The standard gate action now moves the punch holder upward until the finish punch is in axial alignment with the die. The punch holder moves forward and a ram moves the finish punch into the die cavity, upsetting the coned contact into finished shape. The gate action now retracts the finish punch and actuates the knockout pin. The cycle now repeats with the coning punch returned to alignment with the die, together with a new segment of wire.

As the coning and finish punches are mounted on a single punch block, it will be noted that when the finish punch is advancing into the die cavity to deliver the finish blow, the coning punch is also necessarily advancing toward but not to the die block at its "rest" position. It will be further noted that each punch is in its "retracted" position whenever it is not being pushed into the die cavity, so the retracted position includes the rest position.

Reference is made to FIG. 1, which shows a coning punch assembly in cross section. A punch holder block 10 has a bore 12 wherein coning punch holder 14 is retained. In some machines, holder 14 is rigidly attached to block 10 and in some it is mounted for independent forward movement at both the active and rest positions; this is immaterial insofar as the present invention is concerned. At the forward end of holder 14 a central bore 16 slidably retains coning pin 18, which is on the forward end of coning punch 20. The latter is mounted within the larger bore 22 at the rear end of holder 14, spring 24 returning it to the position shown after movement into the die cavity (not shown). Spring 24 is mounted between the forward end of bore 22 and an annular collar 26 at the rear end of punch 20. A ram or piston (not shown) actuates coning punch 20.

The present invention comprises a vertical feed bore 28 normal to bore 16 and adapted to feed discrete parts 30 into bore 16, by gravity, whenever coning pin 18 is not actuated, i.e. when it is retracted. Feed bore 28 communicates with flexible feed tube 32, which supplies discrete parts from a suitable source (not shown). The discrete parts 30 shown are spheres, but it will be appreciated that cylindrical slugs or other shapes could be used. Such parts are not of precisely uniform size, and it is preferred to make the diameter of feed bore 28 a few thousandths oversize, to prevent jamming. The diameter of bore 16, on the other hand, should be just the size of the part or even a thousandth of an inch or so smaller. This prevents part 30 from moving within bore 16 during movement of punch holder block 10 into and out of axial alignment with the die cavity.

When the coning pin 18 is in axial alignment with the die cavity, it is actuated and moves forward, pushing part 30 ahead of it. Forward motion of punch holder block 10, punch holder 14 or both moves the front face of holder 14 up to the die cavity, and part 30 is pushed thereinto and given a coning blow by pin 18. Spring 24 then retracts pin 18 through bore 16, and as soon as feed bore 28 is cleared another discrete part 30 drops into bore 16.

It is often desired to deliver a two-stage coning blow in the formation of a cold-bonded composite electrical contact, and for this purpose a sleeved coning punch is employed. Such a punch, and an alternative embodiment of the invention, are illustrated in FIG. 2.

The coning punch assembly is mounted in a punch holder block 40 having a punch bore 42, and, on the side facing the die, a larger sleeve bore 44. The coning punch 46 is slidably mounted in bore 42 and at its forward and has two annular shoulders 48, 50 and a hammer pin 52. The latter pin 52 fits slidably within the bore 53 of coning sleeve 54. A spacer 56 is threaded into the bottom of bore 44 and partially closes off bore 52, leaving an opening 58 therethrough. A return spring 60 is compressed between shoulder 48 of punch 46 and spacer 56 as the punch advances. Coning sleeve 54 is slidably mounted in a bushing 62 retained in bore 44 by lock and adjusting screw 63 and has an inwardly-extending annular flange 64 at its forward end. Coning sleeve 54 has an outwardly extending annular flange 66 at its rear end adjacent spacer 56. Flanges 64, 66 define the ends of an annular cavity containing the coning sleeve spring 68, which in its expanded state presses the outer portions of flange 66 of sleeve 54 against spacer 56. As coning punch 46 advances in bore 42, shoulder 50 thereon passes through the opening 58 in washer 56 and abutts the inner portions of flange 66 of sleeve 54. At the same time, pin 52 passes into bore 53 of sleeve 54. From the time at which shoulder 50 and flange 66 meet, punch 46 and sleeve 54 advance together.

The foregoing describes the structure and operation of the coning punch when it is actuated and enters the die cavity. When it is at its rest position, however, punch 46 and sleeve 54 are not actuated. The entire mechanism moves toward the die block with the forward movement of the entire punch holder block, but nothing more.

In this embodiment, a flexible feed tube 72 is attached directly to the coning punch assembly, and communicates with a passage 72 leading through coning sleeve 54. Spheres 30 are retained in bore 72 until one is released by the mechanism described below. A sphere 30 in bore 53 is retained therein until pushed out by coning pin 52 by a slight chamfer or detent spring 74. Alternatively, the part-diameter, bore-diameter relations described in connection with FIG. 1 may be employed to retain a sphere 30 in bore 53.

A self-timing feed mechanism is required to prevent parts 30 from being sheared by movement of sleeve 54. This is illustrated in more detail in FIG. 3. In this embodiment, a slot 76 partially intersects passage 72 in the lateral plane, being open at the forward end (nearest the die block) and closed at the opposing end. Slot 76 contains a push rod 78 having a chord-shaped indentation 80 of about the same radius as passage 72. A spring 82 attached to the closed end of slot 76 and the inner end 83 of rod 78 retains rod 78 in its normal position whereat indentation 80 is sufficiently out of register with passage 72 to prevent spheres 30 from passing. The forward end of push rod 78 extends out beyond the forward surface of the coning assembly. In this embodiment, there is provided a projection 84 (FIG. 3) mounted on the die block 85 in axial registration with push rod 78 when the coning assembly is at its rest position. With the forward movement of the coning assembly at this position, projection 84 pushes rod 78 into slot 76, bringing indentation 80 into registration with passage 72 and allowing a sphere to drop into bore 53. Those skilled in the art will appreciate that the accuracy of the timing function in this embodiment can be controlled within narrow limits with (a) the length of rod 78 and (b) the length of indentation 80. Thus, the length of rod 78 controls the distance it moves; this could be substantially the entire period of forward movement of the punch block or only a fraction thereof. Varying the length of projection 84 would have the same effect, of course. By lengthening indentation 80, as shown by dotted lines 86, the time period during which there is registration with passage 72 is increased. In instances where precise positioning of push rod 78 is necessary to insure an accurate timing function, a spring detent 88 can be employed at any convenient point in slot 76 to stop rod 78 while there is still some slight tension in spring 82. It will also be appreciated that the position of slot 76 is not critical, an equivalent assembly could be mounted on the side of the punch block where feed tube 70 is attached.

As noted above, projection 84 is in axial alignment with push rod 78 when the latter is at the rest position. The invention would also be effective, however, if it were in axial alignment with push rod 78 at the active position, i.e. when the coning pin is in alignment with the die. In this case, a sphere 30 is released when the sleeve 54 is advancing and the opening therein is out of alignment with passage 72. Sphere 30 will drop onto the top surface of sleeve 54 and will drop into bore 53 when sleeve 54 returns to its retracted position.

In accordance with the invention, it is possible to feed previously-joined composite parts into the header die. In instances where the axial alignment of the part as it rests in bore 53 is not the same as the header die, the latter can be champfered so as to make the part self-aligning as it enters the die. To join such composite parts, it is preferred to use the bonding method disclosed in copending U.S. application Ser. No. 873,721 filed Nov. 3, 1969. An advantage of this method is that no brazing or soldering materials are used. Slugs of the two materials are bonded in accordance with the teachings of the above-described patent application, and fed into a cold header adapted in accordance with the present invention. Of course, care must be taken to insure that the bonded slugs arrive in bore 53 with the proper orientation, but well-known equipment is capable of this function. When such pre-bonded materials are used with the invention, wire feeds, shearing etc. are eliminated entirely. The same is ture, of course, where unitary parts are to be produced, as opposed to composite parts.

It is to be understood that while the invention has been described with primary reference to producing composite contacts, it is not so limited, and can be utilized in essentially any cold heading operation. Further, shapes other than spheres and cylinders are readily accomodated and may be kept aligned by appropriate shaping of the feed tubes or magazines.

Various other changes in the details, steps, materials and arrangements of parts, which have been herein described and illustrated in order to explain the nature of the invention, may be made by those skilled in the art within the principle and scope of the invention, as defined in the appended claims and their equivalents.

I claim:

1. In a cold heading machine having a stationary header die block with a header die in one face thereof; a moveable punch holder block having a coning punch and a finish punch in a face thereof opposed to said header die block, said coning punch including a relatively moveable coning pin mounted in a bore and a relatively moveable coning sleeve annular to said coning pin and defining said bore; and means for moving said punches into axial alignment with said header die one after the other, means for moving said punch holder block toward and away from said die block, and means for moving said punches into said header die to deliver respective coning and finishing blows, each said punch being in retracted position when not in alignment with said header die; the improvements comprising:

feeding means communicating with said bore and adapted to feed a single discrete part to be cold headed into said bore when said coning punch is at its retracted position, said feeding means comprising a vertical feed tube normal to and communicating with said bore, the inside of said bore being capable of holding only one of said discrete parts beneath said feed tube, and means on said punch holder block for releasing a single discrete part from said tube into said bore when said bore is not in alignment with said header die as said punch holder block approaches said header die block.

2. The cold heading machine as claimed in claim 1 wherein said releasing means comprises:

push-rod means at least partially intersecting said feed tube and extending beyond the face of said punch holder block; said push-rod having a cut-out portion located near said feed tube;

a projection extending from said header die block in axial alignment with said push rod at a given position; and means for retaining said push rod in a normal position with said cut-out portion out of registration with said feed tube, said projection acting to push said cut-out portion into registration with said feed tube with forward movement of said punch holder block, and allow a single discrete part to pass said push rod by gravity.

3. The cold heading machine as claimed in claim 1, wherein said feed tube is slightly larger in cross-section than said discrete part.

4. The cold heading machine as claimed in claim 1, wherein said bore is no larger in cross-section than said discrete part, and is adapted to retain said part therein during movement of said punch holder block.

* * * * *